US009892014B1

(12) United States Patent
Hickey et al.

(10) Patent No.: US 9,892,014 B1
(45) Date of Patent: Feb. 13, 2018

(54) AUTOMATED IDENTIFICATION OF THE SOURCE OF RAID PERFORMANCE DEGRADATION

(71) Applicant: EMC Corporation, Hopkinton, MA (US)

(72) Inventors: Charles Hickey, Aptos, CA (US); Mark Chamness, Menlo Park, CA (US); Orit Levin-Michael, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 14/500,485

(22) Filed: Sep. 29, 2014

(51) Int. Cl.
G06F 11/34 (2006.01)
G06F 11/00 (2006.01)
G06F 3/06 (2006.01)

(52) U.S. Cl.
CPC ........ *G06F 11/3452* (2013.01); *G06F 3/0616* (2013.01); *G06F 3/0647* (2013.01); *G06F 3/0689* (2013.01); *G06F 11/008* (2013.01)

(58) Field of Classification Search
USPC ................................................. 714/47.3, 47
See application file for complete search history.

(56) References Cited

U.S. PATENT DOCUMENTS

| | | | | |
|---|---|---|---|---|
| 6,691,067 B1 * | 2/2004 | Ding | .................. | G06F 11/3447 702/186 |
| 7,877,645 B2 * | 1/2011 | Meyer | .................. | G06F 11/008 714/47.3 |
| 8,015,454 B1 * | 9/2011 | Harrison | ............. | G06F 11/3409 714/47.3 |
| 8,805,647 B2 * | 8/2014 | Smirnov | ............... | G06F 11/008 702/186 |
| 9,189,309 B1 * | 11/2015 | Ma | ....................... | G06F 11/3034 |
| 9,244,792 B1 * | 1/2016 | Fischer | ................... | G06F 11/26 |
| 2003/0004679 A1 * | 1/2003 | Tryon, III | ............ | G06F 11/008 702/182 |
| 2003/0149918 A1 * | 8/2003 | Takaichi | ............... | G11B 27/36 714/42 |
| 2003/0204788 A1 * | 10/2003 | Smith | .................. | G06F 11/008 714/47.3 |
| 2004/0088400 A1 * | 5/2004 | Daggett | ............. | G06F 11/3495 709/224 |
| 2005/0262385 A1 * | 11/2005 | McNeill, Jr. | .......... | G06F 11/008 714/6.2 |
| 2009/0037777 A1 * | 2/2009 | Meyer | .................. | G06F 11/008 714/47.1 |

(Continued)

*Primary Examiner* — Kamini Patel
(74) *Attorney, Agent, or Firm* — Blakely, Sokoloff, Taylor & Zafman LLP

(57) ABSTRACT

Exemplary methods for determining performance degradation of one or more disks at a storage system include analyzing disk performance statistics of a target storage system periodically collected during a storage of data from a source storage system to the target storage system, wherein the target storage system is a redundant array of inexpensive disks (RAID) storage system comprising of one or more arrays, each array comprising of a plurality of disks. The methods further include creating a predictive model based on the analysis of the collected performance statistics, and predicting, using the predictive model, that one or more disks of an array of the one or more arrays of the RAID storage system has degraded in performance.

27 Claims, 6 Drawing Sheets

(56) References Cited

U.S. PATENT DOCUMENTS

| | | | |
|---|---|---|---|
| 2009/0089503 A1* | 4/2009 | Yoshida | G06F 11/008 711/114 |
| 2009/0271657 A1* | 10/2009 | McCombs | G06F 11/004 714/6.2 |
| 2016/0070628 A1* | 3/2016 | Joshi | G06F 11/2094 714/6.22 |

* cited by examiner

AUTOMATED IDENTIFICATION OF THE SOURCE OF RAID PERFORMANCE DEGRADATION

FIELD

Embodiments of the present invention relate generally to data storage systems. More particularly, embodiments of the invention relate to prediction of performance degradation of redundant array of inexpensive disks (RAID) disks.

BACKGROUND

RAID is a technology that employs collections of disk drives (herein referred to simply as disks) and allows them to be used as a logical unit. RAID provides greater performance and reliability (e.g., through the use of a protection scheme called "parity") than a single disk. Data is distributed across the disks and, therefore, the performance of a RAID group is dependent on the performance of each disk. Throughout the description, a RAID group shall interchangeably be referred to as a RAID array. If a single disk experiences performance degradation the RAID group will also have performance degradation. Disks exhibiting poor performance should, therefore, be proactively removed from operation within the RAID group and replaced with a new disk drive.

Conventionally, a large number of statistics are available and collected for determining disk-drive performance and health. These include the industry standard Self-Monitoring, Analysis, and Reporting Technology (SMART) data for Serial Advanced Technology Attachment (SATA) disks, and various log pages for Small Computer System Interface (SCSI) disks. Analyzing this massive amount of statistics, however, can be resource intensive, and often results in false positives. Here, a false positive refers to a disk that has been erroneously identified as having performance degradation when in fact it is in normal operating condition. Thus, there is a need for a simple and efficient mechanism to check disk-drive health that will yield a low-rate of false positives.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Figure 1:
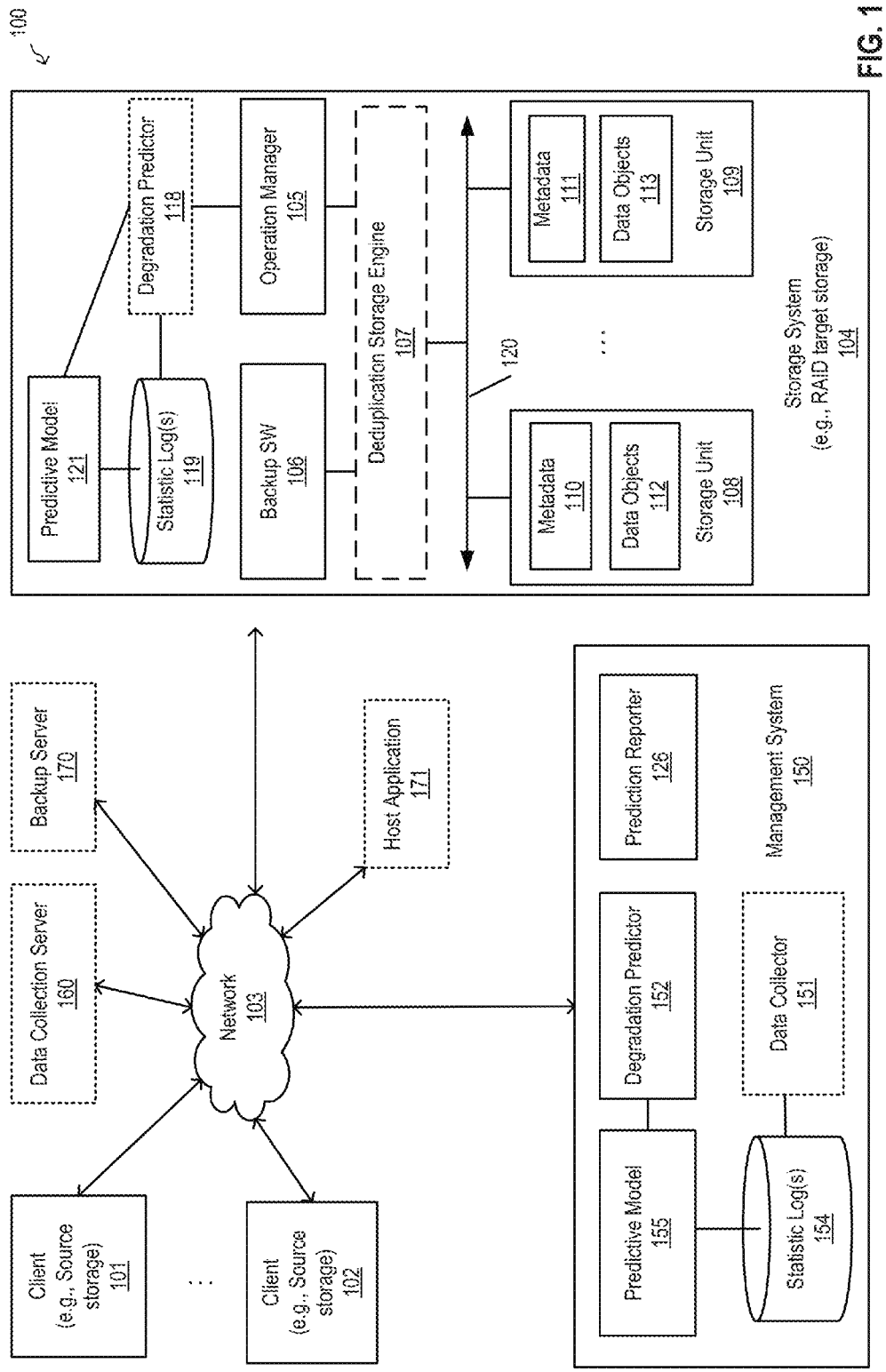
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

References in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for predicting a RAID disk has degraded in performance are herein described. Throughout the description, a RAID disk that has degraded in performance shall simply be referred to as a degraded disk. Throughout the description, disk performance degradation prediction is described as being performed by a management system. It shall be understood, however, that similar predictions can be performed the RAID storage system itself. According to one embodiment, the management system analyzes disk performance statistics collected during storage of data from a source storage system to the RAID storage system. The performance statistics include, but are not limited to, usage observations, read-byte-counts, write-byte-counts, or any combination thereof.

As used herein, a "usage observation" refers to a numeric value that indicates how busy a disk was during a particular time period (e.g., during a time interval). The usage observation may be a ratio between the total time that the disk utilized to process requests (e.g., read, write, replicate requests, etc.) and the time of the interval. For example, assuming a time interval of 24 hours, a usage observation of 0.5 indicates that the disk spent a total of 12 out of 24 hours processing requests. As used herein, a "read-byte-count" refers to a count that indicates how many bytes were read from the disk during a particular time interval. As used herein, a "write-byte-count" refers to a count that indicates how many bytes were written to the disk during a particular time interval.

According to one embodiment, the management system analyzes the performance statistics in order to identify degraded disks of a RAID group/array. Identifying degraded disks includes determining a population mean of the usage observations of all disks that belong to the same RAID group. Here, a "RAID group" refers to a collection of disks on a RAID storage system that appears as a single physical disk to the source storage system. A RAID array is a set of disks where data is written in "striped" form across all the disks at once, and for which parity is calculated and written with the data. The population mean is determined for a population data set. A data set refers to all performance statistics that are observed during the same time interval (e.g., 60 minutes, 24 hours, etc.) In one embodiment, the management system then determines a population standard deviation of the usage observations based on the determined population mean. According to one embodiment, for each disk of the RAID group, the management system then determines a Z-score based on the disk's usage observation, the determined population mean, and the population standard deviation. As used herein, a Z-score refers to the number of standard deviations that a particular observation is above or below the mean of the data set. Thus, in this context, the Z-score of a disk refers to how many standard deviations its usage observation is above or below the population mean.

According to one embodiment, the management system determines that a disk with a high Z-score has degraded in performance. Here, a high Z-score refers to a Z-score that is greater than a predetermined Z-score threshold (e.g., 3 standard deviations). In one embodiment, in order to minimize false positives, the management system determines whether there was an imbalanced workload during the time interval. Here, an imbalanced workload refers to a phenomenon where certain disks of the RAID group are utilized more frequently than other disks of the same RAID group. In such an embodiment, the management system determines a standard deviation of the read-byte-counts of all disks of the RAID group, and a standard deviation of the write-byte-counts of all disks of the RAID group. In one embodiment, if the sum of these 2 standard deviations are not within a predetermined percentage (e.g., 10%) of the standard deviation of the usage observations, the management system determines that there was an imbalanced workload during the sample time period, and discards the entire set of observations without performing any prediction.

According to one embodiment, in order to minimize false positives, the management system determines whether a predicted degraded disk has a high Z-score for at least a first predetermined amount of time out of a second consecutive predetermined amount of time. For example, the management system determines that a high Z-score disk is a degraded disk only if it has a high Z-score for at least 3 out of 5 consecutive days. In yet another embodiment, in order to minimize false positives, the management system determines whether the predicted degraded disk has a usage observation that is greater than a predetermined usage threshold. Thus, for example, the management system may determine that a disk has not degraded even though it has a high Z-score because its usage observation is below the usage threshold.

Throughout the description, performance statistics are described as being collected and analyzed by the management system for illustrative purposes. One having ordinary skill in the art would recognize that these operations can be performed by any system in the network. For example, the RAID system itself may collect and/or analyze the performance statistics and locally determine whether any of the disks has degraded. Further, the management system may be configured to determine the usage observations, read-byte-counts, write-byte-counts, etc., rather than collecting them from the RAID storage system. In such an embodiment, the RAID storage system is configured to transmit raw operating statistics (e.g., time logs of when read/writes occur, etc.) to the management system. Various embodiments of the present invention shall become apparent through the description of various other figures below.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers, such as storage systems available from EMC® Corporation of Hopkinton, Mass. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. The storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, storage system 104 further includes backup application/software (SW) 106 configured to perform backup from source storage systems (e.g., clients 101-102) to storage system 104 (i.e., the target storage). Backup SW 106 is also configured to perform restore from target storage system 104 to the source storage systems. In one embodiment, backup SW 106 is configured to periodically collect and transmit performance statistic data representing at least some of storage system 104 operating statistics, to management system 150 and/or data collection server 160 over network 103. One having ordinary skill in the art would recognize that backup SW 106 can be implemented as part of the source storage servers (e.g., clients 101-102) and/or a dedicated backup server (e.g., backup server 170). In one embodiment, backup SW 106 can be implemented as part of a host application (e.g., host application 171). For example, backup SW 106 can be implemented as part of the Oracle® Database (DB) application.

In one embodiment, storage system 104 further includes operation manager 105 configured to periodically collect and transmit performance statistic data representing at least some of storage system 104 operating statistics, to management system 150 and/or data collection server 160 over network 103. This may be the case, for example, in embodiments where backup SW 106 is not implemented as part of storage system 104. In one embodiment, the performance statistic data collected by backup SW 106 and/or operation manager 105 includes, but not limited to, usage observations, read-byte-counts, write-byte-counts, or any combination thereof.

In the example illustrated in FIG. 1, storage system 104 may be located at a client site and utilized by a client such as an enterprise or corporation, where the storage system 104 may be provided by a storage provider or vendor such as EMC Corporation. In one embodiment, management system 150 is associated with a storage provider or vendor that provides storage system 104 to a client. For example, management system 150 may be operated or owned by the storage provider or alternatively, it may be operated by a third-party vendor on behalf of the storage provider.

According to one embodiment, management system 150 includes data collector 151, predictor 152, and predictive model 155. Data collector 151 is employed to communicate with operation manager 105 and/or backup SW 106 to collect statistic data described above. Note that although one storage system is shown, data collector 151 may communicate with multiple operation managers and/or multiple backup applications of multiple storage systems to collect statistic data concerning the respective storage systems, which may be located at the same or different geographical locations (e.g., same or different client sites). For example, management system 150 may be a centralized management server or cluster of servers for single or multiple clients or customers. In one embodiment, some operations of the backup applications may be running as part of the application that the backup applications protect, for example, Oracle, VMware, etc.

The collected performance statistic data is stored in a storage device as part of statistic logs 154. In one embodiment, degradation predictor 152 is to perform an analysis on statistic logs 154 to generate predictive model 155 for predicting disk performance degradation. Note that data collector 151 is optional here, as statistic logs 154 can be collected by a third party entity, such as another server (e.g., data collection server 160), and transmitted to management server 150 for processing. Management system 150 and/or data collection server 160 may represent a cloud server or a cluster of cloud servers. Further, in an embodiment where disk performance degradation is determined locally by degradation predictor 118, the performance statistics may be collected and stored as part of statistic logs 119, which is stored in a storage device accessible by storage system 104. In such an embodiment, degradation predictor 118 may perform an analysis on statistic logs 119 to generate predictive model 121 for predicting disk performance degradation. Thus, although throughout the description disk degradation prediction is described as being performed by management system 150, it shall be understood that similar operations can be performed by RAID storage system 104 (e.g., degradation predictor 118 may perform operations similar to those performed by degradation predictor 152, predictive model 121 may include modelling information similar to those included as part of predictive model 155, and statistic logs 119 may include statistics similar to those included as part of statistic logs 154).

According to one embodiment, management system 150 further includes prediction reporter 126 configured to send notifications indicating certain predetermined predictions have occurred. For example, prediction reporter 126 is configured to send notifications when a disk degradation is predicted. Similar reporting mechanisms can be implemented as part of RAID storage system 104 (not shown).

Figure 2:
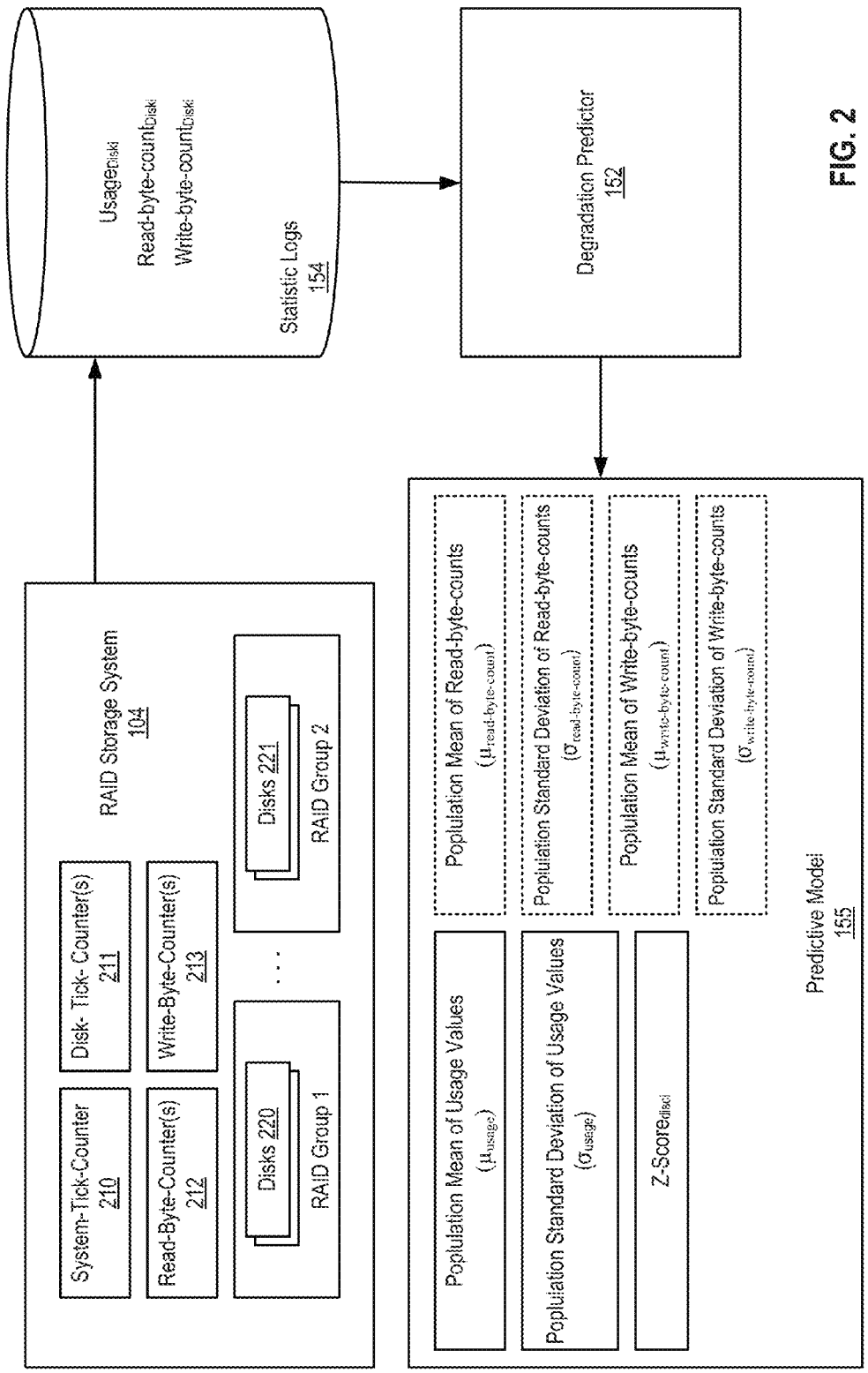
FIG. 2 is a block diagram illustrating the collection and calculation of parameters for and by a storage system according to one embodiment of the invention.

FIG. 2 is a block diagram illustrating a storage system according to one embodiment of the invention. The storage system illustrated in FIG. 2 is similar to the storage system illustrated in FIG. 1. Certain details have been omitted in FIG. 2, however, in order to avoid obscuring the invention. Certain details have also been added in FIG. 2 in order to better illustrate the invention.

FIG. 2 illustrates RAID storage system 104 comprising of RAID groups (i.e., arrays) 1-2. RAID storage system 104, however, can include more or less RAID groups (i.e., arrays). A typical RAID storage system can include, for example, up to 56 RAID groups. Each RAID group includes multiple disks. A typical RAID group can include, for example, up to 14 disks. In the illustrated example, RAID group 1 includes disks 220, and RAID group 2 includes disks 221.

FIG. 2 illustrates RAID storage system 104 comprising of system-tick-counter 210, disk-tick-counter(s) 211, read-byte-counter(s) 212, and write-byte-counter(s) 213. System-tick-counter 210 contains the number system ticks that have occurred/elapsed since RAID storage system 104 was booted up. As used herein, a "system tick" (herein referred to simply as a "tick") is a Unix term for a time unit (e.g., 1 millisecond), which in the Linux kernel is referred to as a "Jiffy". Disk-tick-counters 211 represent disk tick counters, each counter corresponding to a disk on RAID storage system 104. Each counter of disk-tick-counters 211 contains the number of ticks that the respective disk spent processing one or more requests since the time the disk was discovered by RAID storage system 104. As used herein, "discovering" a disk refers to RAID storage system 104 detecting the presence of the disk (e.g., when RAID storage system boots up, when the disk is inserted into RAID storage system 104, etc.) By way of example, a disk-tick-counter with an observation of 100 indicates that the respective disk spent 100 ticks processing one or more requests since the time the disk was discovered.

Read-byte-counters 212 represent read byte counters, each counter corresponding to a disk on RAID storage system 104. Each counter of read-byte-counters 212 contains the number of bytes that have been read from the respective disk since the time the disk was discovered by RAID storage system 104. By way of example, a read-byte-counter with an observation of 100 indicates that 100 bytes have been read from the respective disk since the time the disk was discovered.

Write-byte-counters 213 represent write byte counters, each counter corresponding to a disk on RAID storage system 104. Each counter of write-byte-counters 213 contains the number of bytes that have been written to the respective disk since the time the disk was discovered by RAID storage system 104. By way of example, a write-byte-counter with an observation of 100 indicates that 100 bytes have been written to the respective disk since the time the disk was discovered.

Disk drives in RAID storage system 104, in one embodiment, are "hot-pluggable" and can be swapped in and out at any time. All the disk-specific counters (e.g., disk-tick-counters 211, read-byte-counters 212, and write-byte-counters 213) are set to zero when the disk is discovered, when RAID storage system 104 itself is booted up, or the disk is hot-inserted any time after system booted up.

According to one embodiment, performance statistics of the disks are collected and stored as part of statistic logs 154. In the illustrated example, performance statistics $Usage_{diski}$, $Read\text{-}byte\text{-}count_{diski}$, and $Write\text{-}byte\text{-}count_{diski}$ are collected and stored as part of statistic logs 154. The determination of these statistics are illustrated in FIG. 3.

Figure 3:
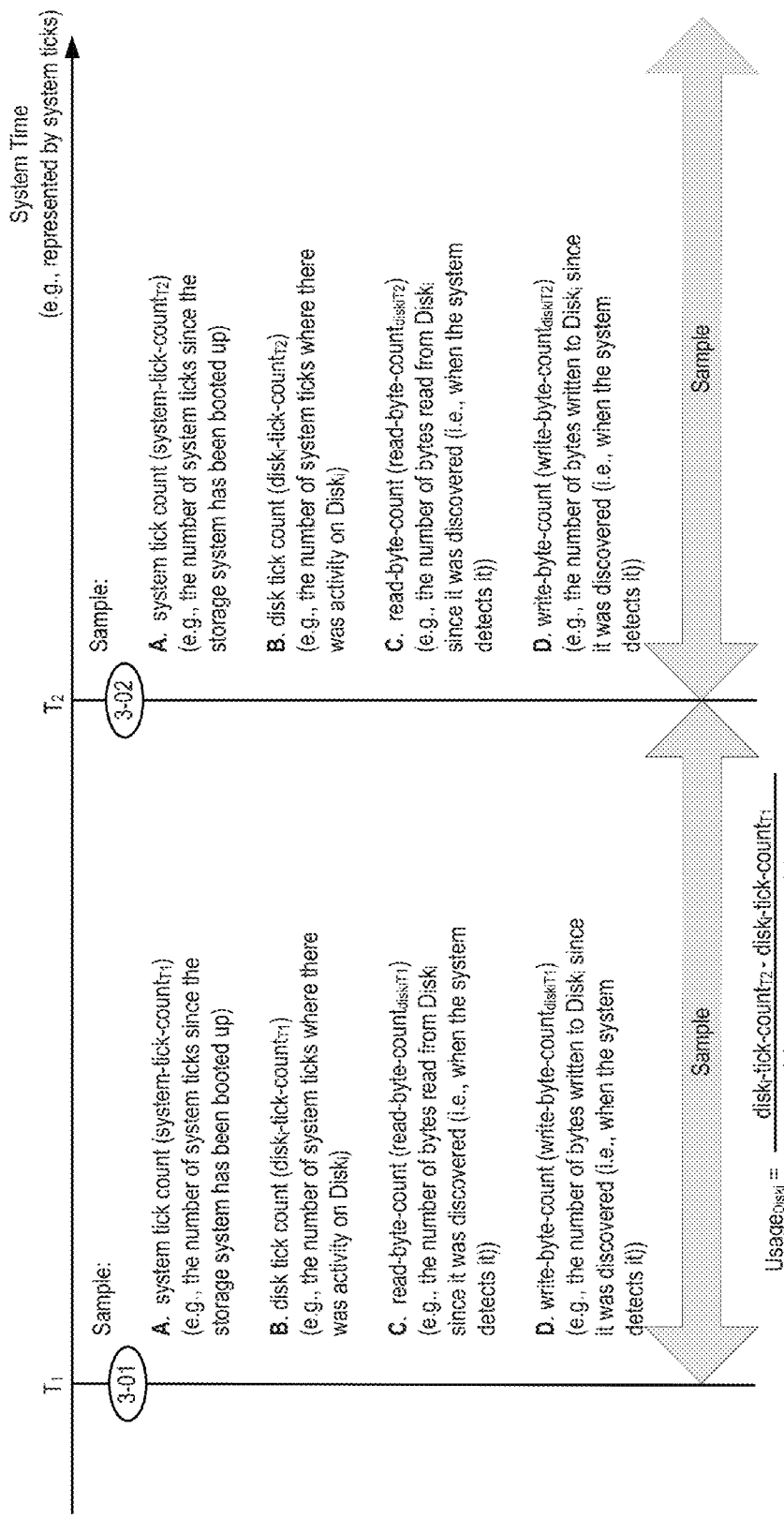
FIG. 3 is a timing diagram illustrating determination of performance statistics according to one embodiment.

FIG. 3 is a timing diagram illustrating the computation of $Usage_{diski}$, $Read\text{-}byte\text{-}count_{diski}$, and $Write\text{-}byte\text{-}count_{diski}$, according to one embodiment. FIG. 3 illustrates two sets of data for two time intervals. Throughout the description, disk performance degradation prediction is described in the context of the time interval that extends from time $T_1$ to $T_2$. One having ordinary skill in the art would recognize that similar predictions can be made based on statistics collected for any set of observations.

At transaction 3-01, storage system 104 (e.g., operation manager 105 of storage system 104) logs/samples the current system tick count and stores it as system-tick-count$_{T1}$. For example, storage system 104 samples the current observation system-tick-counter 210 and stores it as system-tick-count$_{T1}$. As part of transaction 3-01, storage system 104 also samples the current disk tick count corresponding to Disk$_i$ and stores it as disk$_i$-tick-count$_{T1}$. For example, storage system 104 samples the current observation of a disk-tick-counter 211 that corresponds to Disk, and stores it as disk$_i$-tick-count$_{T1}$.

As part of transaction 3-01, storage system 104 also samples the current read byte count corresponding to Disk, and stores it as read-byte-count$_{diskiT1}$. For example, storage system 104 samples the current observation of a read-byte-counter 211 that corresponds to Disk, and stores it as read-byte-count$_{diskT1}$. As part of transaction 3-01, storage system 104 also samples the current write byte count corresponding to Disk, and stores it as write-byte-count$_{diskT1}$. For example, storage system 104 samples the current observation of a write-byte-counter 211 that corresponds to Disk, and stores it as write-byte-count$_{diskiT1}$.

At transaction 3-02, storage system 104 logs/samples the current system tick count and stores it as system-tick-count$_{T2}$. For example, storage system 104 samples the current observation system-tick-counter 210 and stores it as system-tick-count$_{T2}$. As part of transaction 3-02, storage system 104 also samples the current disk tick count corresponding to Disk, and stores it as disk$_i$-tick-count$_{T2}$. For example, storage system 104 samples the current observation of a disk-tick-counter 211 that corresponds to Disk, and stores it as $disk_i\text{-tick-count}_{T2}$.

As part of transaction 3-02, storage system 104 also samples the current read byte count corresponding to Disk, and stores it as read-byte-count$_{diskiT2}$. For example, storage system 104 samples the current observation of a read-byte-counter 211 that corresponds to Disk, and stores it as read-byte-count$_{diskiT2}$. As part of transaction 3-02, storage system 104 also samples the current write byte count corresponding to Disk, and stores it as write-byte-count$_{diskiT2}$. For example, storage system 104 samples the current observation of a write-byte-counter 211 that corresponds to Disk, and stores it as write-byte-count$_{diskiT2}$.

In one embodiment, storage system 104 determines Usage$_{diski}$ (i.e., the usage observation of Disk$_i$) of the sample by determining the ratio of the total amount of time Disk$_i$ utilized to process all access requests during the time interval. In this example, storage system 104 determines Usage$_{diski}$ by applying the following equation:

$$\text{Usage}_{diski} = \frac{(disk_i\text{-tick-count}_{T2} - disk_i\text{-tick-count}_{T1})}{(\text{system-tick-count}_{T2} - \text{system-tick-count}_{T1})}. \quad \text{Equation (1)}$$

In one embodiment, storage system 104 determines Read-byte-count$_{diski}$ (i.e., the total number of bytes read from Disk, during the time interval) by determining the difference between the running total of bytes read from Disk, at the end of the time interval and the running total of bytes read from Disk, at the beginning of the time interval. In this example, storage system 104 determines Read-byte-count$_{diski}$ by applying the following equation:

Read-byte-count$_{diski}$=(read-byte-count$_{diskT2}$−read-byte-count$_{diskiT1}$) Equation (2).

In one embodiment, storage system 104 determines Write-byte-count$_{diski}$ (i.e., the total number of bytes written to Disk$_i$ during the sample) by determining the difference between the running total of bytes written to Disk$_i$ at the end of time interval and the running total of bytes written to Disk, at the beginning of the time interval. In this example, storage system 104 determines Write-byte-count$_{diski}$ by applying the following equation:

Write-byte-count$_{diski}$=(write-byte-count$_{diskiT2}$−write-byte-count$_{diskiT1}$) Equation (3).

One having ordinary skill in the art would recognize that Usage$_{disci}$, Read-byte-count$_{diski}$, and/or Write-byte-count$_{diski}$ can be computed by other systems in the network. For example, Usage$_{disci}$, Read-byte-count$_{diski}$, and/or Write-byte-count$_{diski}$ can be computed by management system 150. In such an embodiment, storage system 104 can transmit raw operating statistics (e.g., observations of counters and/or the deltas of the counters, etc.) to management system 150, and management system 150 can compute Usage$_{disci}$, Read-byte-count$_{diski}$, and/or Write-byte-count$_{diski}$ based on the raw statistics. In other words, the operations illustrated in FIG. 3 can be performed in a distributed manner.

Referring now back to FIG. 2. In one embodiment, predictor 152 generates predictive model 155 using performance statistics stored as part of statistic logs 154. In one embodiment, predictor 152 generates the population mean of the usage observations (μ) by adding up all the usage observations of the observations, and dividing the sum by the number of usage observations in the population. In this example, predictor 152 can determine population mean of usage observations by applying the following equation:

$$\mu_{Usage} = \frac{\left(\sum_{i=1}^{n} \text{Usage}_{diski}\right)}{n}. \quad \text{Equation (4)}$$

Throughout the description, various equations are described which reference the variable "n". As used herein, "n" refers the number of disks in the disk group (i.e., array) for which the prediction is being made. A RAID array is one set of disks where data is written in "striped" form across all the disks at once, and for which parity is calculated and written with the data. Typical storage systems, such as those provided by EMC®, have 1 to 56 or more such arrays. The mechanism for predicting degraded disks described herein is effective in part because it looks at just the family of disks in the disk group (i.e. array), and for the vast majority of cases they are receiving very similar workloads, and thus their relative performance can be determined.

In one embodiment, predictor 152 is further configured to generate the population standard deviation of the usage observations ($\sigma_{usage}$) by first determining the population variance of the usage observations ($\sigma^2_{usage}$). The population variance of the usage observations is determined by determining a difference of the population mean of the usage observations and each usage observation, adding up the square of each difference, and then dividing the sum by the number of usage observations in the population. In this example, predictor 152 can determine the population variance of the usage observations by applying the following equation:

$$\sigma^2_{usage} = \frac{\left(\sum_{i=1}^{n} (\mu_{usage} - \text{Usage}_{diski})^2\right)}{n}. \quad \text{Equation (5)}$$

Predictor 152 then determines the population standard deviation of the usage observations by taking the square root of the population variance of the usage observations. In this example, predictor 152 can determine the population standard deviation of usage observations by applying the following equation:

$\sigma_{usage}$=square root($\sigma^2_{usage}$) Equation (6).

According to one embodiment, in order to determine whether one or more disks of RAID storage system 104 has degraded in performance, predictor 152 generates a Z-Score for each of the disks. Predictor 152 generates a Z-Score of a disk by determining a difference between its usage observation and the population mean of usage observations, and dividing the difference by the population standard deviation of the usage observations. For example, predictor 152 can determine Z-Score$_{diski}$ by applying the following equation:

$$\text{Z-Score}_{diski} = \frac{(\text{Usage}_{diski} - \mu_{usage})}{\sigma_{usage}}. \quad \text{Equation (7)}$$

In one embodiment, predictor 152 determines that a disk has degraded in performance if it has a high Z-Score. Here, a high Z-Score refers to a Z-Score that is greater than a predetermined Z-Score threshold (e.g., 3 or more standard deviations). In this example, predictor 152 can predict whether $Disk_i$ has degraded in performance by applying the following equations:

$Disk_i$ degraded=Z-Score$_{diski}$>predetermined Z-Score threshold    Equation (8).

As described above, a high Z-Score indicates that the disk has degraded in performance. For example, if the population standard deviation is 5%, and the population mean is 50%, then a disk with a Z-Score of 3 has 15% more usage (i.e., 65% usage), for the same work load. A RAID group/array is only as fast as its slowest disk. By applying mechanisms of the present invention, a degraded disk can be identified and replaced with another disk in order to prevent the entire RAID storage system from slowing down or failing.

According to one embodiment, predictor 152 is configured to minimize false positives (i.e., to minimize the probability of falsely identifying a degraded disk) by ensuring that the workload is well balanced between the disks of the RAID group during the sample period. In one embodiment, if the workload is not well balanced, predictor 152 discards the set of observations without performing any prediction. In one embodiment, predictor 152 determines whether the workload is well balanced between the disks by generating the population mean of the read-byte-counts of the observations ($\mu_{read\text{-}byte\text{-}count}$), by applying the following equation:

$$\mu_{read\text{-}byte\text{-}count} = \frac{\left(\sum_{i=1}^{n} \text{read-byte-count}_{diski}\right)}{n}.$$

Equation (9)

In one embodiment, predictor 152 is further configured to generate the population standard deviation of the read-byte-counts of the observations ($\sigma_{read\text{-}byte\text{-}count}$) by first determining the population variance of the read-byte-counts ($\sigma_{read\text{-}byte\text{-}count}^2$). The population variance of the read-byte-counts is determined by determining a difference of the population mean of the read-byte-counts and each read-byte-count observation, adding up the square of each difference, and then dividing the sum by the number of read-byte-counts in the population. In this example, predictor 152 can determine the population variance of the read-byte-counts by applying the following equation:

$$\sigma_{read\text{-}byte\text{-}count}^2 = \frac{\left(\sum_{i=1}^{n} \left(\mu_{read\text{-}byte\text{-}count} - \text{read-byte-count}_{diski}\right)^2\right)}{n}.$$

Equation (10)

Predictor 152 then determines the population standard deviation of the read-byte-counts ($\sigma_{read\text{-}byte\text{-}count}$) by taking the square root of the population variance of the read-byte-counts. In this example, predictor 152 can determine population standard deviation of the read-byte-counts by applying the following equation:

$\sigma_{read\text{-}byte\text{-}count}$=square root($\sigma_{read\text{-}byte\text{-}count}^2$)    Equation (11).

Predictor 152 then generates the population mean of the write-byte-counts ($\mu_{write\text{-}byte\text{-}count}$), by applying the following equation:

$$\mu_{write\text{-}byte\text{-}count} = \frac{\left(\sum_{i=1}^{n} \text{write-byte-count}_{diski}\right)}{n}.$$

Equation (12)

In one embodiment, predictor 152 is further configured to generate the population standard deviation of the write-byte-counts of the observations ($\sigma_{write\text{-}byte\text{-}count}$) by first determining the population variance of the write-byte-counts of the observations ($\alpha_{write\text{-}byte\text{-}count}^2$). The population variance of the write-byte-counts is determined by determining a difference of the population mean of the write-byte-counts and each write-byte-count, adding up the square of each difference, and then dividing the sum by the number of write-byte-counts in the population. In this example, predictor 152 can determine the population variance of the write-byte-counts by applying the following equation:

$$\sigma_{write\text{-}byte\text{-}count}^2 = \frac{\left(\sum_{i=1}^{n} \left(\mu_{write\text{-}byte\text{-}count} - \text{write-byte-count}_{diski}\right)^2\right)}{n}.$$

Equation (13)

Predictor 152 then determines the population standard deviation of the write-byte-counts of the observations ($\sigma_{write\text{-}byte\text{-}count}$) by taking the square root of the population variance of the write-byte-counts. In this example, predictor 152 can determine population standard deviation of the write-byte-counts by applying the following equation:

$\sigma_{write\text{-}byte\text{-}count}$=square root($\sigma_{write\text{-}byte\text{-}count}^2$)    Equation (14).

Next, predictor 152 adds the population standard deviation of the read-byte-counts and the population standard deviation of the write-byte-counts, by applying the following equation:

Sum=$\sigma_{read\text{-}byte\text{-}count}$+$\sigma_{write\text{-}byte\text{-}count}$    Equation (15).

In one embodiment, predictor 152 determines that the workload was balanced well among the disks of the RAID group if the sum is within a predetermined percentage (e.g., 10%) of the population standard deviation of the usage observations. In this example, predictor 152 can determine that the workload was balanced by applying the following equation:

Workload was balanced=sum<($\sigma_{usage}$/predetermined percentage threshold)    Equation (16).

By way of example, assume that the predetermined percentage threshold is 10%, if the population standard deviation of the usage observations is 2%, and the sum of the standard deviation of the read-byte-counts and write-byte-counts is 0.3%, then the workload was not balanced because the sum exceeds the 10% threshold. As described above, if the workload was not balanced when the observations were taken, predictor 152 simply discards the observations without performing any prediction.

In one embodiment, predictor 152 is configured to minimize false positives by determining that the disk with a high Z-Score has a usage observation that is greater than a predetermined usage threshold. In such an embodiment, in addition to determining that Disk$_i$ has a high Z-Score, predictor 152 can determine whether Disk, has degraded in performance by applying the following equations in order to minimize false positives:

$$\text{Disk}_i\text{degraded}=\text{Usage}_{diski}>\text{predetermined usage threshold} \quad \text{Equation (17)}.$$

According to one embodiment, predictor 152 is configured to minimize false positives by determining that the disk with a high Z-Score has a high Z-Score for at least a first predetermined amount of time (e.g., 3 days) out of a second consecutive predetermined amount of time (e.g., 5 consecutive days). The unit of time described above (i.e., days) are for illustrative purposes. One having ordinary skill in the art would recognize that other units can be used. For example, predictor 152 can be configured such that a disk must have a high Z-Score for 3 out of 5 consecutive samples taken.

The mechanisms for minimizing false positives described above assume that a set of high Z-scores are determined, and one or more high Z-scores are then removed from the set if the criteria are not satisfied (e.g., the usage observation is not greater than the predetermined usage threshold). One having ordinary skill in the art would recognize that the set of high Z-scores can be determined after it has been determined that the criteria are satisfied. For example, a disk with a usage observation that is not greater than the predetermined usage threshold can be removed as a candidate without determining its Z-score. Further, one having ordinary skill in the art would recognize that the criteria for minimizing false positives described above can be used in any combination thereof.

Figure 4:
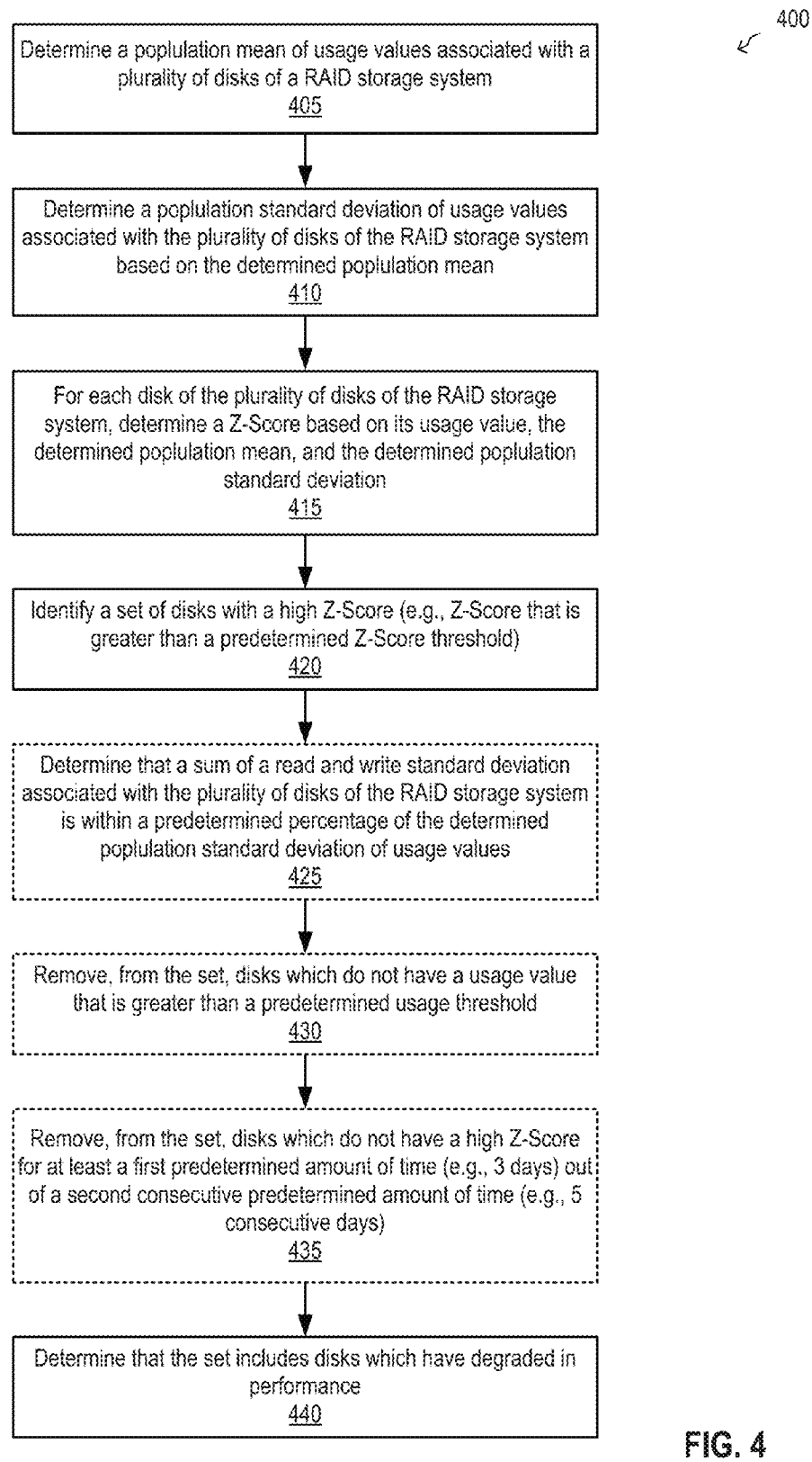
FIG. 4 is a flow diagram illustrating a method for determining disks which have degraded in performance according to one embodiment.

FIG. 4 is a flow diagram illustrating method 400 for determining performance degradation of one or more disks at a RAID storage system. For example, method 400 can be performed by predictor 152, which can be implemented in software, firmware, hardware, or any combination thereof.

Referring now to FIG. 4. At block 405, a predictor determines a population mean of usage observations associated with a plurality of disks of a RAID storage system. For example, predictor 152 applies Equation (4). At block 410, the predictor determines a population standard deviation of usage observations associated with the plurality of disks of the RAID storage system based on the determined population mean. For example, predictor 152 applies Equation (6). At block 415, the predictor, for each disk of the plurality of disks of the RAID storage system, determines a Z-Score based on its usage observation, the determined population mean, and the determined population standard deviation. For example, predictor 152 applies Equation (7).

At block 420, the predictor identifies a set of disks with a high Z-Score (e.g., Z-Score that is greater than a predetermined Z-Score threshold). For example, predictor 152 applies Equation (8). At block 425, the predictor optionally determines that a sum of a read and write standard deviation associated with the plurality of disks of the RAID storage system is within a predetermined percentage of the determined population standard deviation of usage observations. For example, predictor 152 applies Equation (16).

At block 430, the predictor optionally removes, from the set, disks which do not have a usage observation that is greater than a predetermined usage threshold. For example, predictor 152 applies Equation (17) to determine whether Disk, should be removed from the set of candidates. At block 435, the predictor removes, from the set, disks which do not have a high Z-Score for at least a first predetermined amount of time (e.g., 3 days) out of a second consecutive predetermined amount of time (e.g., 5 consecutive days). At block 440, the predictor determines that the set includes disks which have degraded in performance.

Although the processes or methods are described above in terms of some sequential operations, it should be appreciated that some of the operations described may be performed in a different order. Moreover, some operations may be performed in parallel rather than sequentially. Further, some operations may not be performed in some embodiments. For example, blocks 425, 430, and 435 are optional, and can be performed in different orders than as described above.

Figure 5:
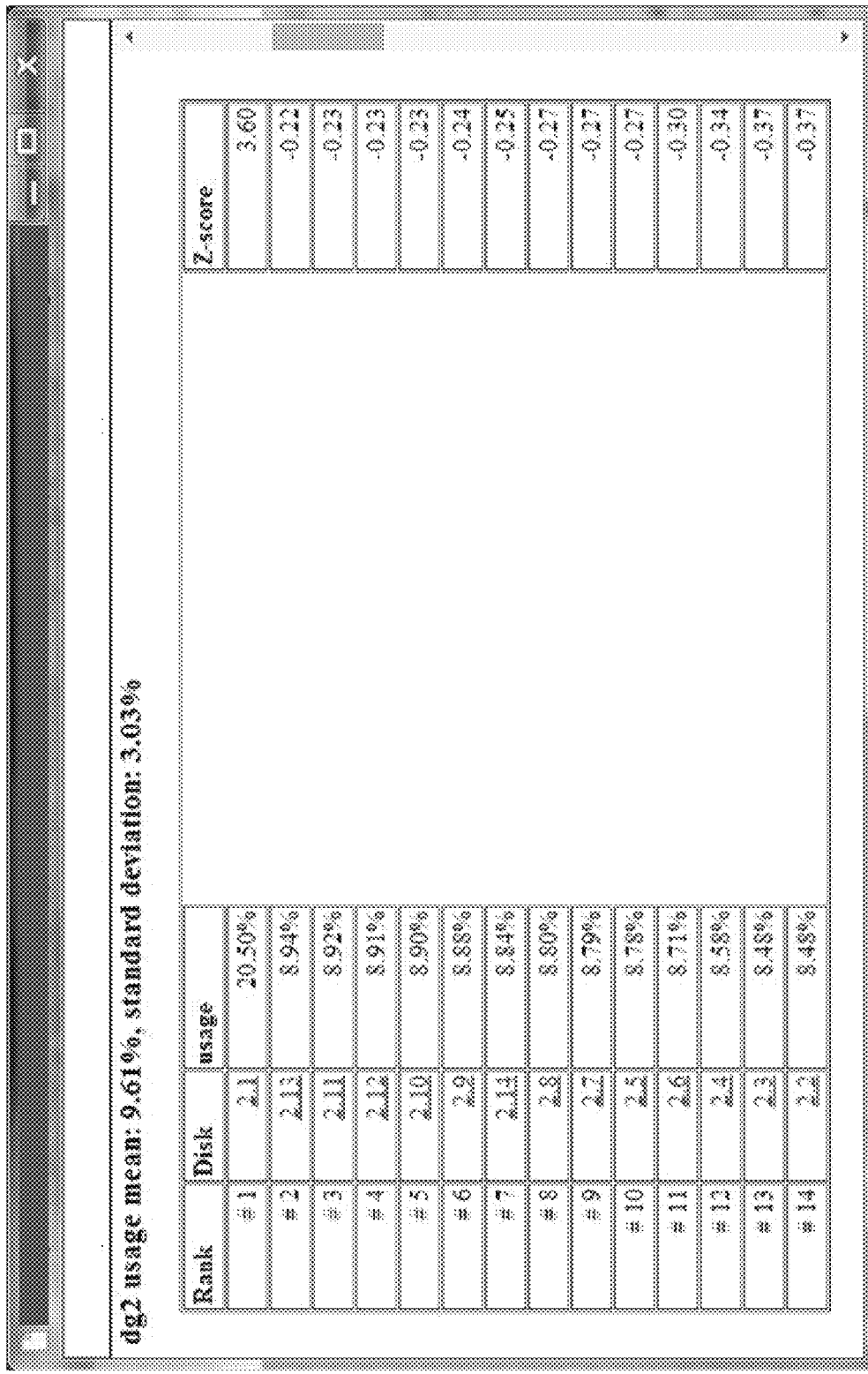
FIG. 5 is a diagram illustrating a display of disks and their respective performance statistics according to one embodiment.

FIG. 5 is a diagram illustrating an example of a graphical user interface (GUI) for displaying disks and their respective performance statistics. For example, the GUI may be generated prediction reporter 126 of management system 150, or a prediction reporter of RAID storage system 104 (not shown). In the illustrated GUI, the reporter has predicted that disk 2.1 has degraded in performance because it has a Z-score of 3.6.

Figure 6:
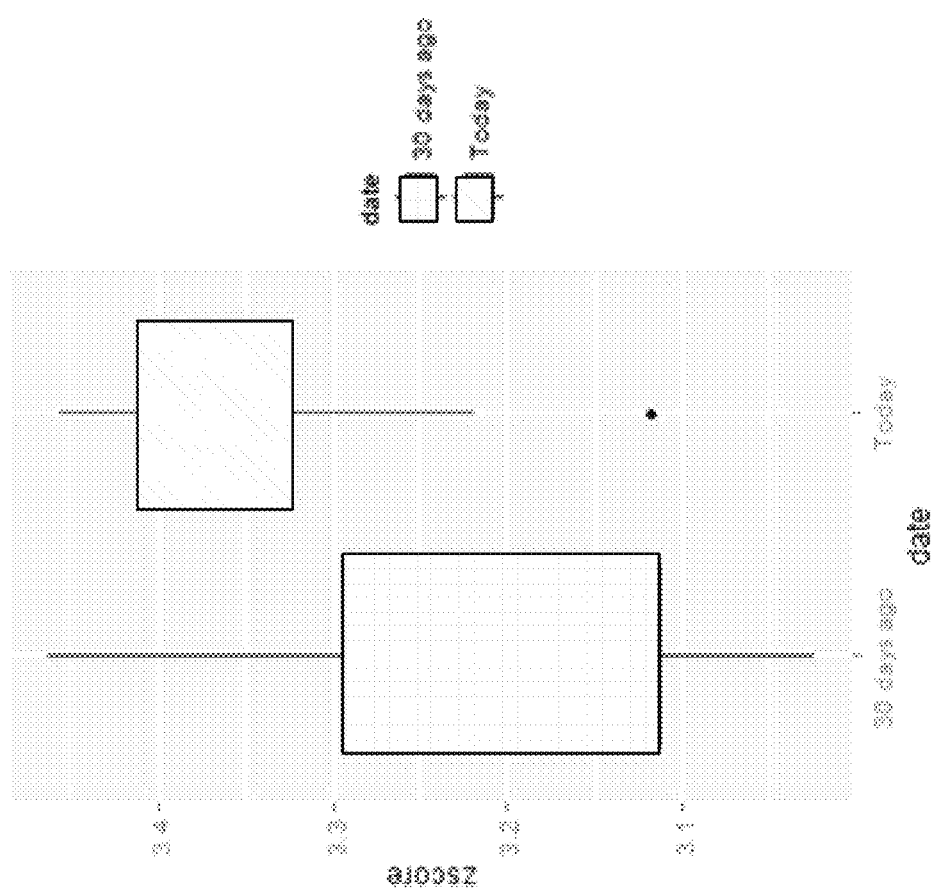
FIG. 6 is a diagram illustrating the results of a prediction of disk performance degradation according to one embodiment.

FIG. 6 is a diagram illustrating the effectiveness of the present mechanisms for predicting disk performance degradation. FIG. 6 illustrates that most of the disks that had a high Z-score 30 days ago still have a high Z-score today (and on average, even higher).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:
    analyzing disk performance statistics of a target storage system periodically collected during a storage of data from a source storage system to the target storage system, wherein the target storage system is a redundant array of inexpensive disks (RAID) storage system comprising of one or more arrays, each array comprising of a plurality of disks, wherein the disk performance statistics include at least a usage observation;
creating a predictive model based on the analysis of the collected performance statistics, wherein creating the predictive model includes:
    determining a population mean of the disk performance statistics, and
    determining a population standard deviation of the disk performance statistics based on the population mean; and
    predicting, using the predictive model, that one or more disks of an array of the one or more arrays of the RAID storage system has degraded in performance, wherein predicting, using the predictive model, that the one or more disks of the array has degraded includes:
        generating a Z-Score for each of the one or more disks of the array, wherein, for each of the one or more disks, generating the Z-score includes:
            determining a difference between the usage observation and the population mean of usage observations, and dividing the difference by the population standard deviation of the usage observations, and
        determining, for each of the one or more disks, whether the Z-Score is greater than a Z-Score threshold, wherein, when the Z-Score is greater than the Z-Score threshold, a disk degradation is predicted.

2. The method of claim 1, wherein the disk performance statistics include the usage observation for each disk of the array of the RAID storage system, wherein each usage observation indicates an amount of time a respective disk was busy processing disk access requests during a time interval.

3. The method of claim 2, wherein creating the predictive model comprises:
    determining the population mean of the usage observations associated with the plurality of disks of the array the RAID storage system; and
    determining the population standard deviation of the usage observations associated with the plurality of disks of the array of the RAID storage system based on the population mean.

4. The method of claim 3, wherein predicting that one or more disks of the array of the RAID storage system has degraded in performance comprises:
    determining that the usage observation of one or more disks of the array of the RAID storage system is at least a predetermined number of standard deviations from the population standard deviation.

5. The method of claim 4, wherein the disk performance statistics further include a read byte count and a write byte count for each disk of the array of the RAID storage system, wherein each read byte count indicates a number of bytes read from a respective disk during the time interval, and wherein each write byte count indicates a number of bytes written to a respective disk during the time interval.

6. The method of claim 5, wherein predicting that one or more disks of the array of the RAID storage system has degraded in performance further comprises:
    determining the population mean of the read byte counts associated with the plurality of disks of the array of the RAID storage system;
    determining the population standard deviation of the read byte counts associated with the plurality of disks of the array of the RAID storage system based on the population mean;
    determining the population mean of the write byte counts associated with the plurality of disks of the array of the RAID storage system; and
    determining the population standard deviation of the write byte counts associated with the plurality of disks of the array of the RAID storage system based on the population mean.

7. The method of claim 6, wherein predicting that one or more disks of the RAID storage system has degraded in performance further comprises:
    determining a standard deviation sum of the population standard deviation of the read byte counts and the population standard deviation of the write byte counts; and
    determining that the standard deviation sum is within a predetermined percentage of the population standard deviation of the usage observations.

8. The method of claim 4, wherein predicting that one or more disks of the array of the RAID storage system has degraded in performance further comprises:
    determining that the usage observation of one or more disks of the array of the RAID storage system is at least the predetermined number of standard deviations from the population standard deviation for at least a first predetermined amount of time out of a second consecutive predetermined amount of time.

9. The method of claim 4, wherein predicting that one or more disks of the array of the RAID storage system has degraded in performance further comprises:
    determining that the usage observation of one or more disks of the array of the RAID storage system is greater than a predetermined usage threshold.

10. A non-transitory computer-readable storage medium having computer code stored therein, which when executed by a processor, cause the processor to perform operations comprising:
    analyzing disk performance statistics of a target storage system periodically collected during a storage of data from a source storage system to the target storage system, wherein the target storage system is a redundant array of inexpensive disks (RAID) storage system comprising of one or more arrays, each array comprising of a plurality of disks, wherein the disk performance statistics include at least a usage observation;
creating a predictive model based on the analysis of the collected performance statistics, wherein creating the predictive model includes:
  determining a population mean of the disk performance statistics, and
  determining a population standard deviation of the disk performance statistics based on the population mean; and
predicting, using the predictive model, that one or more disks of an array of the one or more arrays of the RAID storage system has degraded in performance, wherein predicting, using the predictive model, that the one or more disks of the array has degraded includes:
  generating a Z-Score for each of the one or more disks of the array, wherein, for each of the one or more disks, generating the Z-score includes:
    determining a difference between the usage observation and the population mean of usage observations, and dividing the difference by the population standard deviation of the usage observations, and
  determining, for each of the one or more disks, whether the Z-Score is greater than a Z-Score threshold, wherein, when the Z-Score is greater than the Z-Score threshold, a disk degradation is predicted.

11. The non-transitory computer-readable storage medium of claim 10, wherein the disk performance statistics include the usage observation for each disk of the array of the RAID storage system, wherein each usage observation indicates an amount of time a respective disk was busy processing disk access requests during a time interval.

12. The non-transitory computer-readable storage medium of claim 11, wherein creating the predictive model comprises:
  determining the population mean of the usage observations associated with the plurality of disks of the array the RAID storage system; and
  determining the population standard deviation of the usage observations associated with the plurality of disks of the array of the RAID storage system based on the population mean.

13. The non-transitory computer-readable storage medium of claim 12, wherein predicting that one or more disks of the array of the RAID storage system has degraded in performance comprises:
  determining that the usage observation of one or more disks of the array of the RAID storage system is at least a predetermined number of standard deviations from the population standard deviation.

14. The non-transitory computer-readable storage medium of claim 13, wherein the disk performance statistics further include a read byte count and a write byte count for each disk of the array of the RAID storage system, wherein each read byte count indicates a number of bytes read from a respective disk during the time interval, and wherein each write byte count indicates a number of bytes written to a respective disk during the time interval.

15. The non-transitory computer-readable storage medium of claim 14, wherein predicting that one or more disks of the array of the RAID storage system has degraded in performance further comprises:
  determining the population mean of the read byte counts associated with the plurality of disks of the array of the RAID storage system;
  determining the population standard deviation of the read byte counts associated with the plurality of disks of the array of the RAID storage system based on the population mean;
  determining the population mean of the write byte counts associated with the plurality of disks of the array of the RAID storage system; and
  determining the population standard deviation of the write byte counts associated with the plurality of disks of the array of the RAID storage system based on the population mean.

16. The non-transitory computer-readable storage medium of claim 15, wherein predicting that one or more disks of the RAID storage system has degraded in performance further comprises:
  determining a standard deviation sum of the population standard deviation of the read byte counts and the population standard deviation of the write byte counts; and
  determining that the standard deviation sum is within a predetermined percentage of the population standard deviation of the usage observations.

17. The non-transitory computer-readable storage medium of claim 13, wherein predicting that one or more disks of the array of the RAID storage system has degraded in performance further comprises:
  determining that the usage observation of one or more disks of the array of the RAID storage system is at least the predetermined number of standard deviations from the population standard deviation for at least a first predetermined amount of time out of a second consecutive predetermined amount of time.

18. The non-transitory computer-readable storage medium of claim 13, wherein predicting that one or more disks of the array of the RAID storage system has degraded in performance further comprises:
  determining that the usage observation of one or more disks of the array of the RAID storage system is greater than a predetermined usage threshold.

19. A data processing system, comprising:
a set of one or more processors; and
a non-transitory machine-readable storage medium containing code, which when executed by the set of one or more processors, cause the data processing system to
  analyze disk performance statistics of a target storage system periodically collected during a storage of data from a source storage system to the target storage system, wherein the target storage system is a redundant array of inexpensive disks (RAID) storage system comprising of one or more arrays, each array comprising of a plurality of disks, wherein the disk performance statistics include at least a usage observation;
  create a predictive model based on the analysis of the collected performance statistics, wherein creating the predictive model includes:
    determining a population mean of the disk performance statistics, and determining a population standard deviation of the disk performance statistics based on the population mean; and
  predict, using the predictive model, that one or more disks of an array of the one or more arrays of the RAID storage system has degraded in performance wherein predicting, using the predictive model, that the one or more disks of the array has degraded includes:

generating a Z-Score for each of the one or more disks of the array, wherein, for each of the one or more disks, generating the Z-score includes:
  determining a difference between the usage observation and the population mean of usage observations, and dividing the difference by the population standard deviation of the usage observations, and
  determining, for each of the one or more disks, whether the Z-Score is greater than a Z-Score threshold, wherein, when the Z-Score is greater than the Z-Score threshold, a disk degradation is predicted.

20. The data processing system of claim 19, wherein the disk performance statistics include the usage observation for each disk of the array of the RAID storage system, wherein each usage observation indicates an amount of time a respective disk was busy processing disk access requests during a time interval.

21. The data processing system of claim 20, wherein creating the predictive model comprises the data processing system to:
  determine the population mean of the usage observations associated with the plurality of disks of the array the RAID storage system; and
  determine the population standard deviation of the usage observations associated with the plurality of disks of the array of the RAID storage system based on the population mean.

22. The data processing system of claim 21, wherein predicting that one or more disks of the array of the RAID storage system has degraded in performance comprises the data processing system to:
  determine that the usage observation of one or more disks of the array of the RAID storage system is at least a predetermined number of standard deviations from the population standard deviation.

23. The data processing system of claim 22, wherein the disk performance statistics further include a read byte count and a write byte count for each disk of the array of the RAID storage system, wherein each read byte count indicates a number of bytes read from a respective disk during the time interval, and wherein each write byte count indicates a number of bytes written to a respective disk during the time interval.

24. The data processing system of claim 23, wherein predicting that one or more disks of the array of the RAID storage system has degraded in performance further comprises the data processing system to:
  determine the population mean of the read byte counts associated with the plurality of disks of the array of the RAID storage system;
  determine the population standard deviation of the read byte counts associated with the plurality of disks of the array of the RAID storage system based on the population mean;
  determine the population mean of the write byte counts associated with the plurality of disks of the array of the RAID storage system; and
  determine the population standard deviation of the write byte counts associated with the plurality of disks of the array of the RAID storage system based on the population mean.

25. The data processing system of claim 24, wherein predicting that one or more disks of the RAID storage system has degraded in performance further comprises the data processing system to:
  determine a standard deviation sum of the population standard deviation of the read byte counts and the population standard deviation of the write byte counts; and
  determine that the standard deviation sum is within a predetermined percentage of the population standard deviation of the usage observations.

26. The data processing system of claim 22, wherein predicting that one or more disks of the array of the RAID storage system has degraded in performance further comprises the data processing system to:
  determine that the usage observation of one or more disks of the array of the RAID storage system is at least the predetermined number of standard deviations from the population standard deviation for at least a first predetermined amount of time out of a second consecutive predetermined amount of time.

27. The data processing system of claim 22, wherein predicting that one or more disks of the array of the RAID storage system has degraded in performance further comprises the data processing system to:
  determine that the usage observation of one or more disks of the array of the RAID storage system is greater than a predetermined usage threshold.

* * * * *